United States Patent [19]

Urabe et al.

[11] Patent Number: 5,322,038
[45] Date of Patent: Jun. 21, 1994

[54] SUCTION SYSTEM FOR INTERNAL COMBUSTION ENGINE

[75] Inventors: Suehiro Urabe; Takeshi Yamagiwa, both of Fujisawa; Isaya Matsuo; Toshiki Ohara, both of Yokohama, all of Japan

[73] Assignee: Nissan Motor Co., Ltd., Yokohama, Japan

[21] Appl. No.: 70,852

[22] Filed: Jun. 3, 1993

[30] Foreign Application Priority Data

Jun. 19, 1992 [JP] Japan .................. 4-186152
Jun. 19, 1992 [JP] Japan .................. 4-186153
Jun. 19, 1992 [JP] Japan .................. 4-186154
Jun. 19, 1992 [JP] Japan .................. 4-186155
Jun. 19, 1992 [JP] Japan .................. 4-186156

[51] Int. Cl.$^5$ ............................................. F02B 75/18
[52] U.S. Cl. ............................... 123/52 M; 123/52 MB
[58] Field of Search ..................... 123/52 MV, 52 MB

[56] References Cited

U.S. PATENT DOCUMENTS 5,080,051 1/1992 Hitomi et al. ................ 123/52 MV
5,109,811 5/1992 Tanaka et al. ................ 123/52 MB

FOREIGN PATENT DOCUMENTS 60-69255 4/1985 Japan .
62-153516 7/1987 Japan .

Primary Examiner—Noah P. Kamen
Attorney, Agent, or Firm—Foley & Lardner

[57] ABSTRACT

A suction system for a V-type engine includes branch pipes that cross parallel to each other for communicating with cylinders, two aggregate portions disposed inside center lines of opposed banks for aggregating the branch pipes which communicate with the cylinders without regard to the ignition order, two guide pipes connected to the aggregate portions in centers thereof, and a communicating pipe disposed over the branch pipes for communicating with the aggregate portions.

8 Claims, 19 Drawing Sheets

DIRECTIONS OF
CYLINDER BANK

DIRECTIONS OF
CYLINDER BANK

DIRECTIONS OF
CYLINDER BANK

SUCTION SYSTEM FOR INTERNAL COMBUSTION ENGINE

BACKGROUND OF THE INVENTION

The present invention relates to a suction system for an internal combustion engine.

It is preferable that suction passages for an internal combustion engine for an automotive vehicle meet the following conditions: excellent intake efficiency in a wide range of rotation ranging from low speed to high speed and, for a multiple cylinder engine, uniform distribution of air and mixture among cylinders.

Referring to FIG. 11, there is shown a previously proposed suction system for a V-type opposed six cylinder engine which is disclosed, for example, in JP-A 60-69255.

As shown in FIG. 11, there are arranged two aggregate portions or surge tanks 75, 76 for aggregating branch pipes 73, 74 which communicate with cylinders of left and right banks 71, 72. The two aggregate portions 75, 76 are disposed in parallel with a crankshaft, each having an end at which a throttle valve 77 is mounted.

With such a known suction system, however, since the throttle valve 77 is mounted at the end of each aggregate portion 75, 76, the suction passages connecting the throttle valve 77 and the intake valves of the cylinders have different lengths, resulting in a dispersion of the intake efficiency of the cylinders in a range of low speed rotation in which resonance supercharging is carried out.

Further, since the aggregate portions 75, 76 are disposed on center lines of the banks 71, 72, respectively, ignition plugs also disposed on the center lines of the banks 71, 72 cannot be mounted and detached without removing the suction system from an engine main body. Furthermore, due to the above construction, there is a design restriction in that an engine hood line of the vehicle has a center portion higher than a side portion.

It is, therefore, an object of the present invention to provide a suction system for an internal combustion engine which contributes to an increase in the intake efficiency with a restricted overall height of the engine.

SUMMARY OF THE INVENTION

There is provided, according to the present invention, a suction system for a V-type engine of a motor vehicle, the V-type engine being provided with opposed banks having cylinders and throttle valves, the suction system including:

a plurality of branch pipes arranged to communicate with the cylinders, said plurality of branch pipes being disposed to cross parallel with each other;

two aggregate portions, one of said two aggregate portions being connected to ones of said plurality of branch pipes which communicate with ones of the cylinders without regard to the ignition order and the other of said two aggregate portions being connected to the others of said plurality of branch pipes which communicate with the others of the cylinders without regard to the ignition order, said two aggregate portions being disposed inside center lines of the opposed banks;

two guide pipes connected to said two aggregate portions in the center thereof, respectively, said two guide pipes conducting intake air out of the throttle valves; and a communicating pipe disposed over said plurality of branch pipes for communicating with said two aggregate portions.

DETAILED DESCRIPTION OF THE INVENTION

Figure 1:
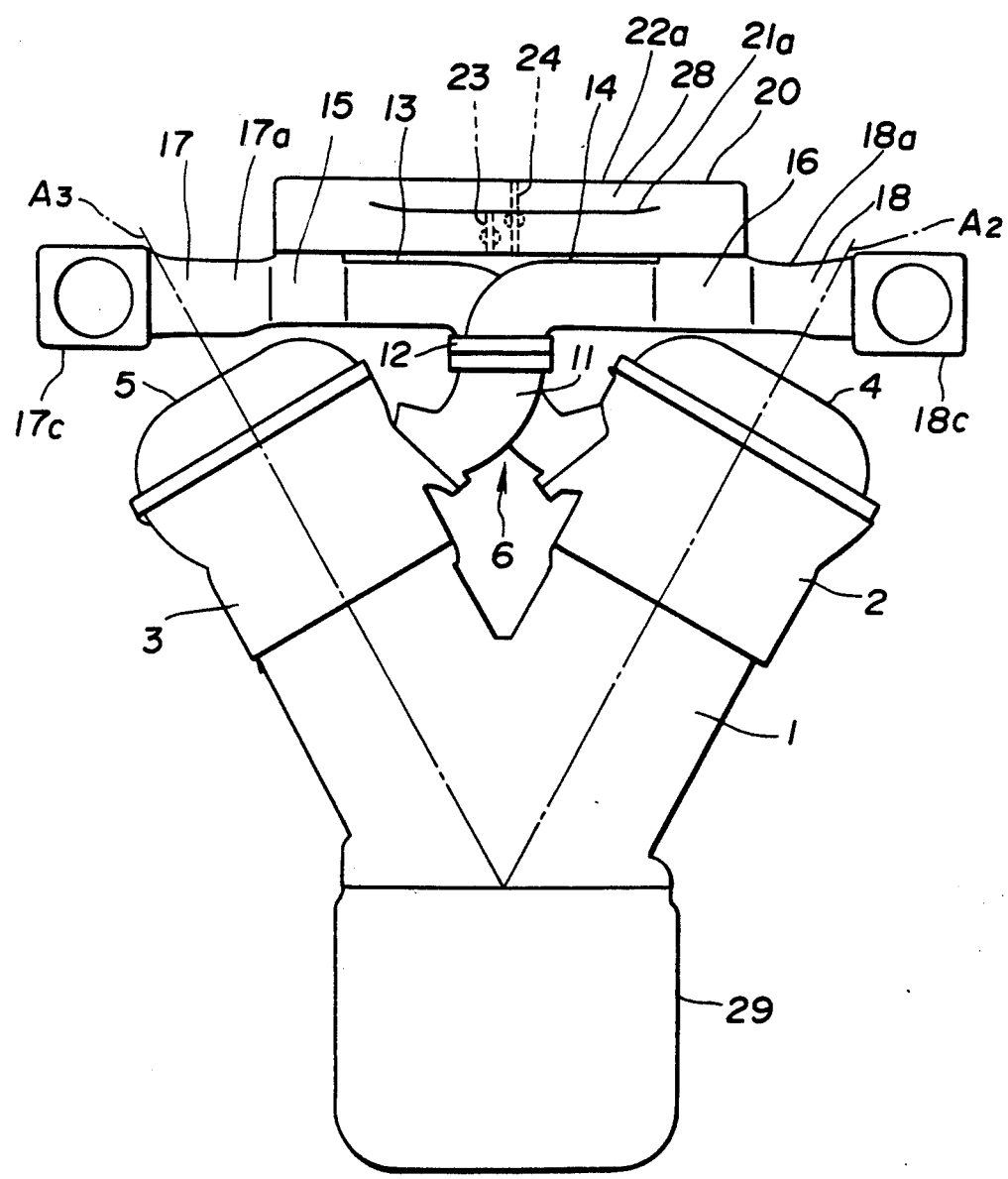
FIG. 1 is a front view showing a first preferred embodiment of a suction system for a V-type engine.
Figure 2:
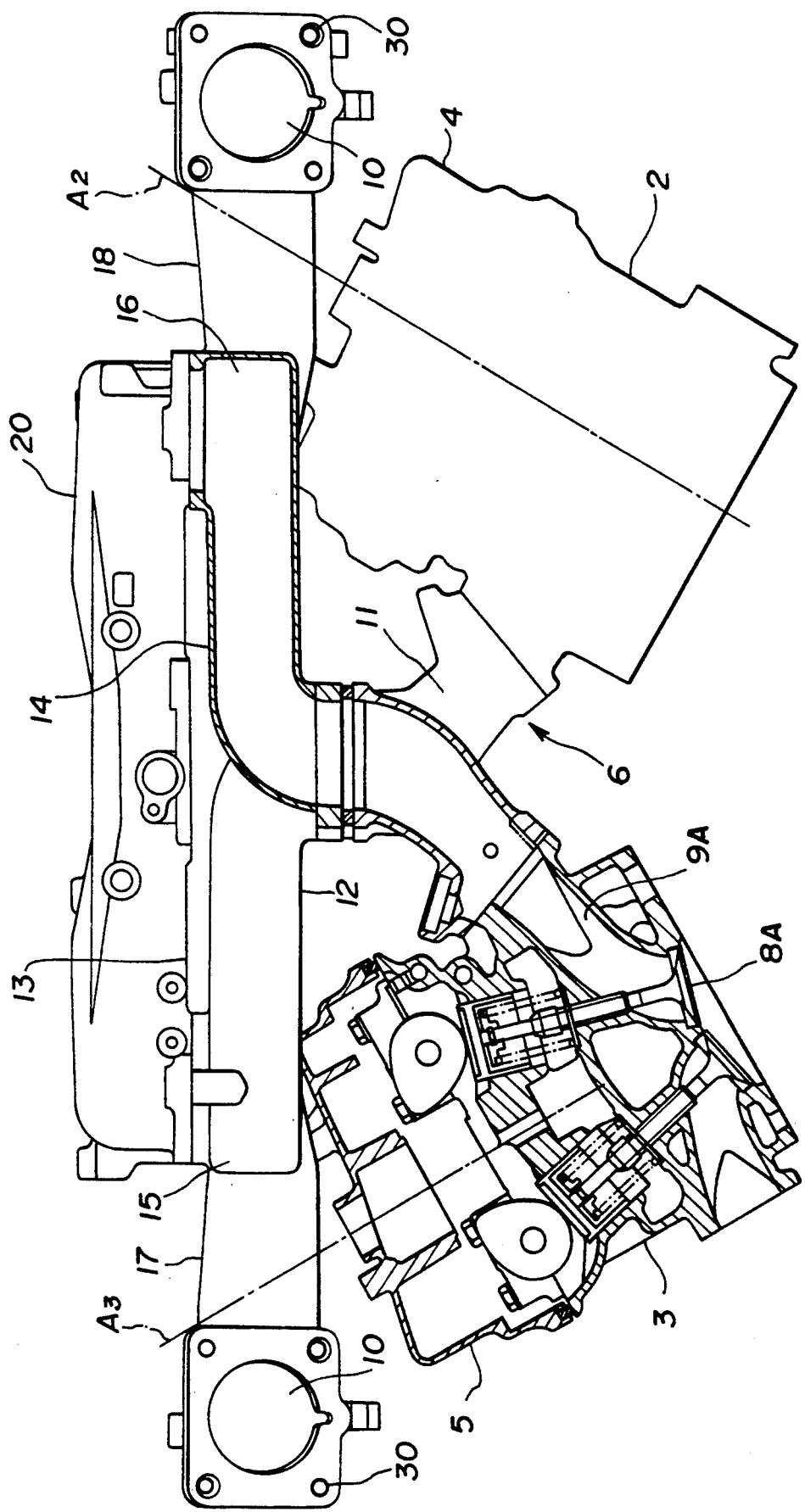
FIG. 2 is a partly enlarged front view showing the first preferred embodiment.

Referring to the drawings wherein like reference numerals designate like parts throughout the views, referring first to FIGS. 1 to 8, there is shown a first preferred embodiment of the present invention. Referring to FIGS. 1 and 2, a V-type six cylinder engine is provided with a cylinder block 1 which bifurcates into right and left cylinder heads 2, 3. An intake 15 manifold 6 is connected to the cylinderer heads 2, 3 in the inner part thereof, whereas exhaust pipes (not shown) are connected thereto in the outer part thereof. It is to be noted that right and left banks include cylinders without regard to of the ignition order.

The intake manifold 6 is divided into a lower manifold 11 which is connected to the right and left cylinder heads 2, 3, and an upper manifold 12 which is connected to the lower manifold 11 at the upper end thereof. As best seen in FIG. 2, the upper manifold 12 includes the following elements as integrally formed: branch pipes 13, 14 which extend horizontally over right and left rocker covers 4, 5 for communicating with intake ports 9A of the right and left cylinder heads 2, 3 via the lower manifold 11, two aggregate portions 15, 16 for aggregating the branch pipes 13, 14, respectively, and two guide pipes 17, 18 for guiding intake air out of throttle valves 10 to the aggregate portions 15, 16, respectively.

Figure 3:
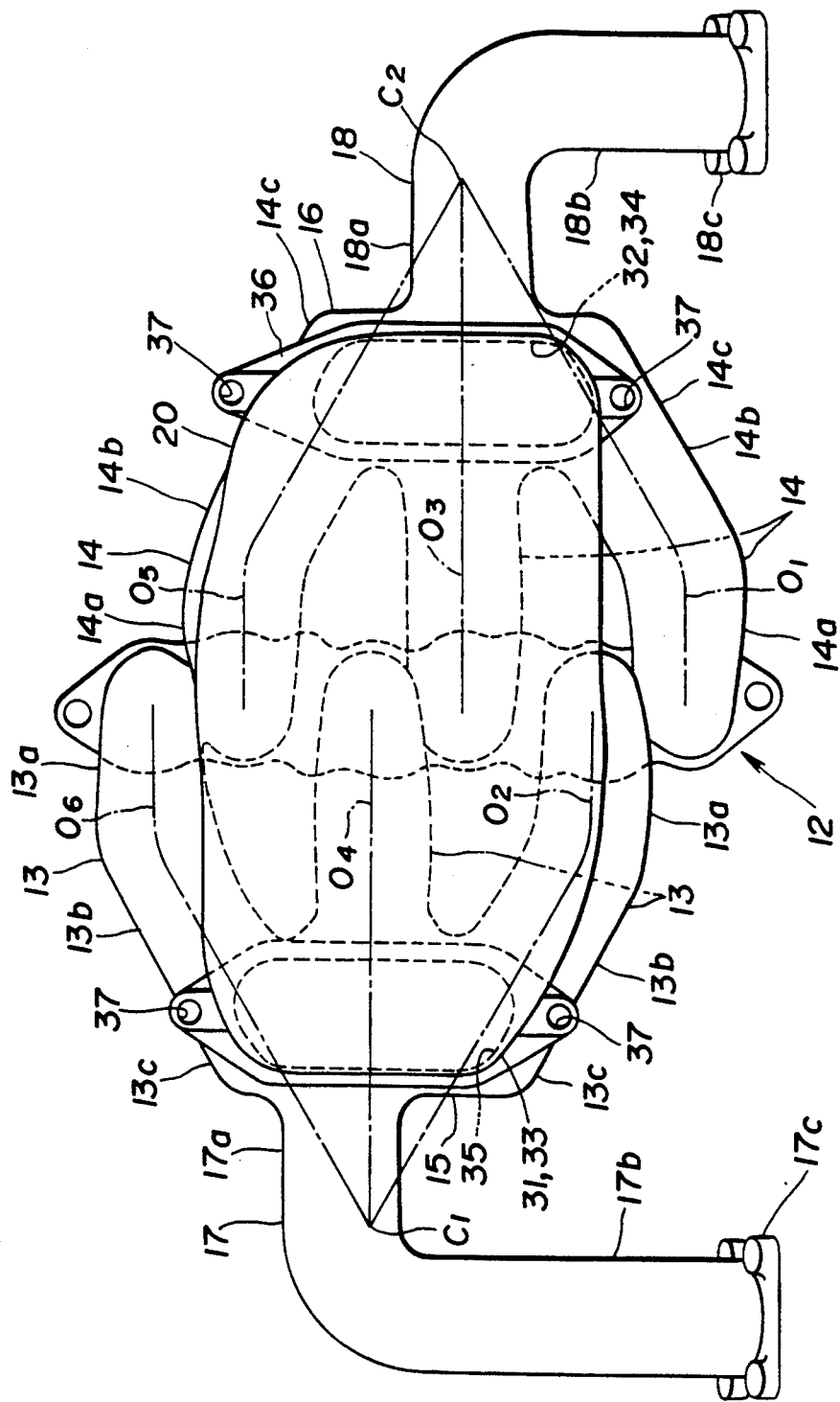
FIG. 3 is a plan view of the suction system.

Referring to FIG. 3, the branch pipes 13, 14 arranged in the center have respective center lines $O_4$, $O_3$ extending linearly in such a direction as to cross a crankshaft (not shown) at right angles, whereas the branch pipes 13, 14 arranged at the front and rear ends have respective center lines $O_1$, $O_2$, $O_5$, $O_6$ turning horizontally on the way so as to intersect at points $C_1$, $C_2$ located on the center lines $O_4$, $O_3$. That is, the center lines $O_2$, $O_4$, $O_6$ intersect at the point $C_1$, whereas the center lines $O_1$, $O_3$, $O_5$ intersect at the point $C_2$. Therefore, the branch pipes 13, 14 arranged at the front and rear ends have respective parallel portions 13a, 14a which cross parallel with each other, and respective inclined portions 13b, 14b which turn from the parallel portions 13a, 14a to the branch pipes 13, 14 as arranged in the center.

Referring also to FIG. 3, the aggregate portions 15, 16 extend parallel with the crankshaft, each serving as a surge tank defined between the branch pipe 13, 14 and the guide pipe 17, 18. On the other hand, the guide pipes 17, 18 have respective orthogonal portions 17a, 18a extending from the center portions of cross the crankshaft at right angles, and respective parallel portions 17b, 18b turning from the orthogonal portions 17a, 18a so as to extend parallel with the crankshaft.

As best seen in FIGS. 1 and 2, the upper manifold 12 extends horizontally over the right and left rocker covers 4, 5. The aggregate portions 16, 15 are arranged inside center lines $A_2$, $A_3$ of the right and left banks or cylinders, respectively, whereas the parallel portions 18b, 17b of the guide pipes 18, 17 are arranged outside the bank center lines $A_2$, $A_3$, respectively.

Figure 4:
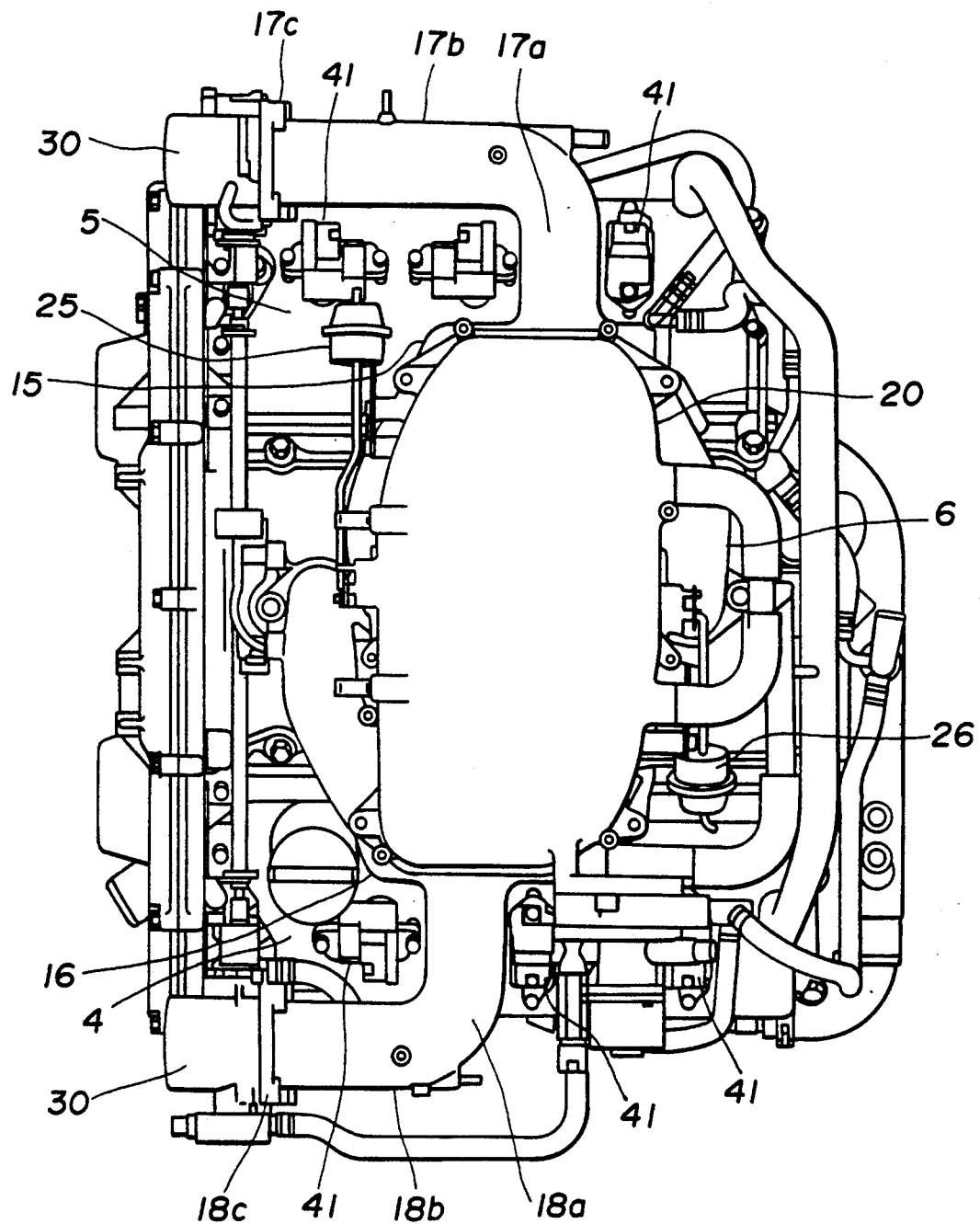
FIG. 4 is a view similar to FIG. 3, showing the V-type engine.

Referring to FIG. 4, the rocker covers 4, 5 are provided with respective ignition coils 41 to correspond to the cylinders, an ignition plug (not shown) being accommodated under the ignition coil 41. Referring also to FIGS. 1 and 2, the ignition coils 41 and the ignition plugs are arranged on the bank center lines $A_2$, $A_3$, and located outside the aggregate portions 16, 15 to facilitate mounting and removal thereof. In the left bank, the front ignition coil 41 is disposed between the aggregate portion 16 and the parallel portion 18b of the guide pipe 18, and the front ignition coil 41 and the center ignition coil 41 are disposed to hold the orthogonal portion 18a therebetween. In the right bank, the center ignition coil 41 is disposed between the aggregate portion 15 and the parallel portion 17b of the guide pipe 17, and the center ignition coil 41 and the rear ignition coil 41 are disposed to hold the orthogonal portion 17a of the guide pipe 17.

Figure 5:
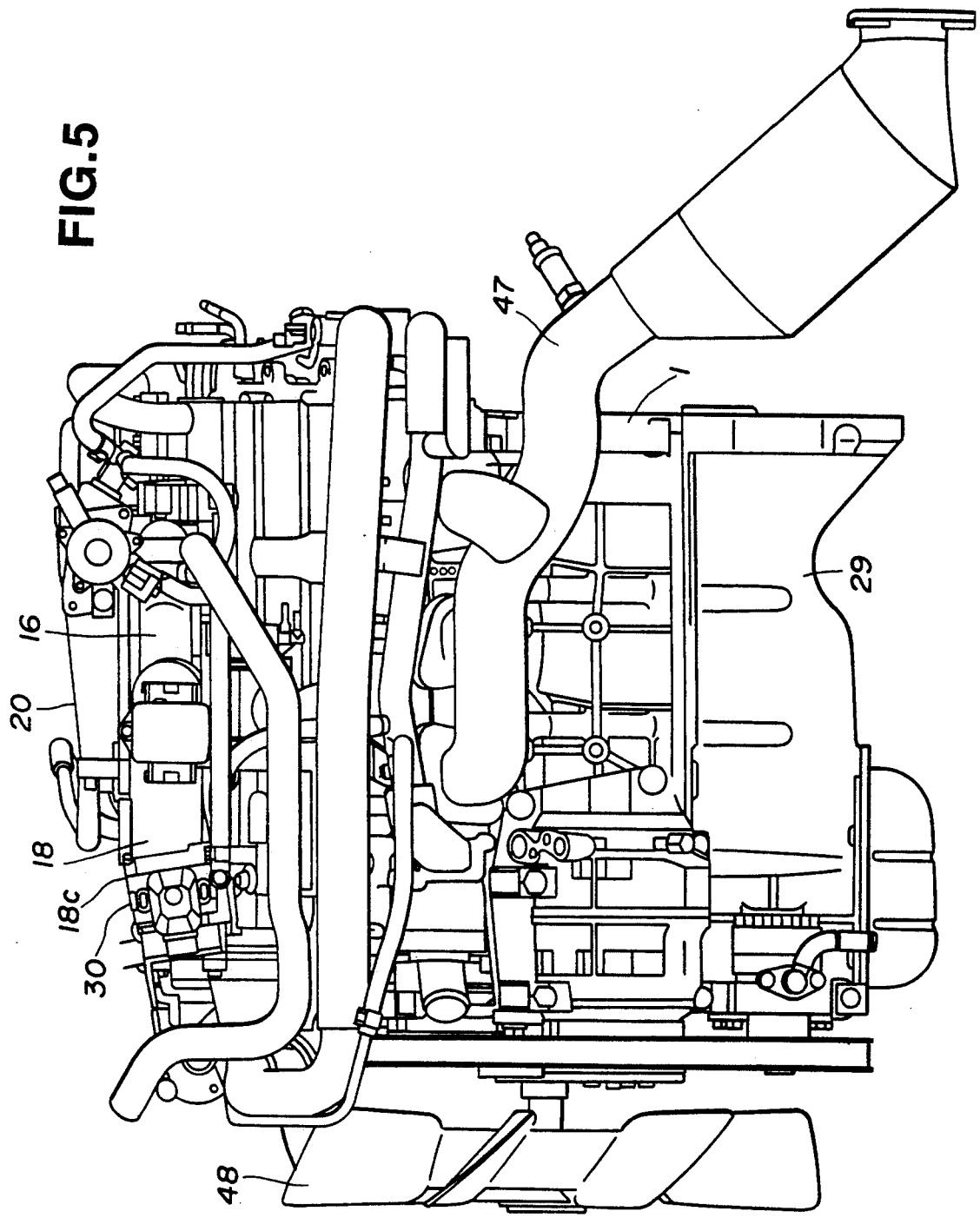
FIG. 5 is a side view showing the V-type engine.

As best seen in FIGS. 4 and 5, the guide pipes 17, is have end portions formed with connecting flanges 17c, 18c for throttle chambers 30, which are inclined downward at a predetermined angle so as to hold the mounting height of the throttle chamber 30 to a lower value. It is to be noted that in FIG. 5, reference numeral 47 designates an exhaust pipe, and 48 designates a radiator fan.

Figure 6:
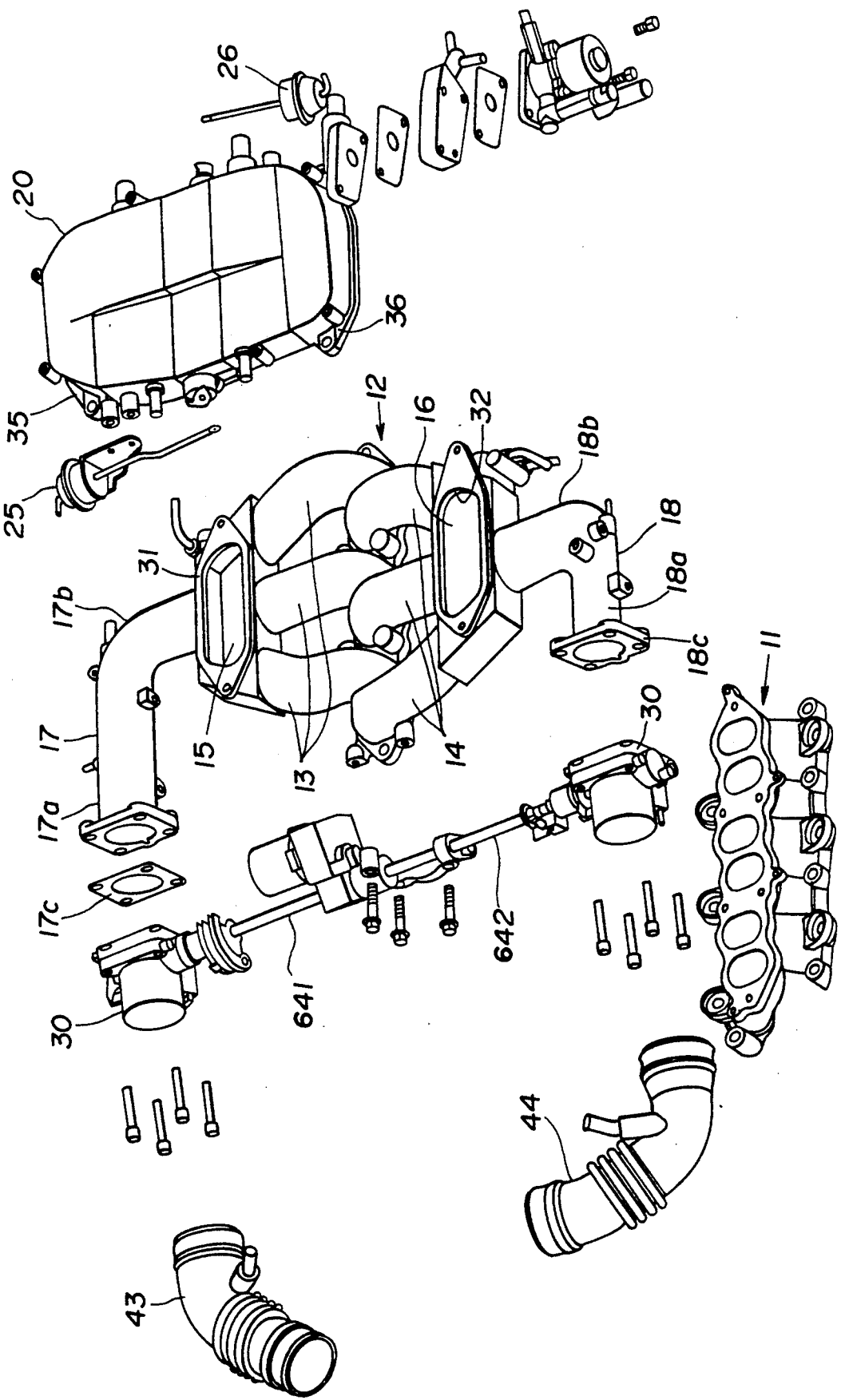
FIG. 6 is a perspective exploded view of the suction system.

Referring to FIGS. 2 and 6, the right and left throttle valves 10 are provided with respective shafts 641, 642 coaxially disposed and connected with each other so as to operate in synchronism with each other by an accelerator pedal (not shown) via a wire.

Connected to the throttle chambers 30 are ducts 43, 44 made of resilient material, through which intake air taken via an air cleaner (not shown) is introduced therein. Suction passages connecting the air cleaner and intake valves 8A of the cylinders are formed so as to have the same length.

As best seen in FIG. 2, the intake manifold 6 is provided with a communicating pipe 20 for communication of the right and left aggregate portions 16, 15 over the branch pipes 13, 14.

Figure 7:
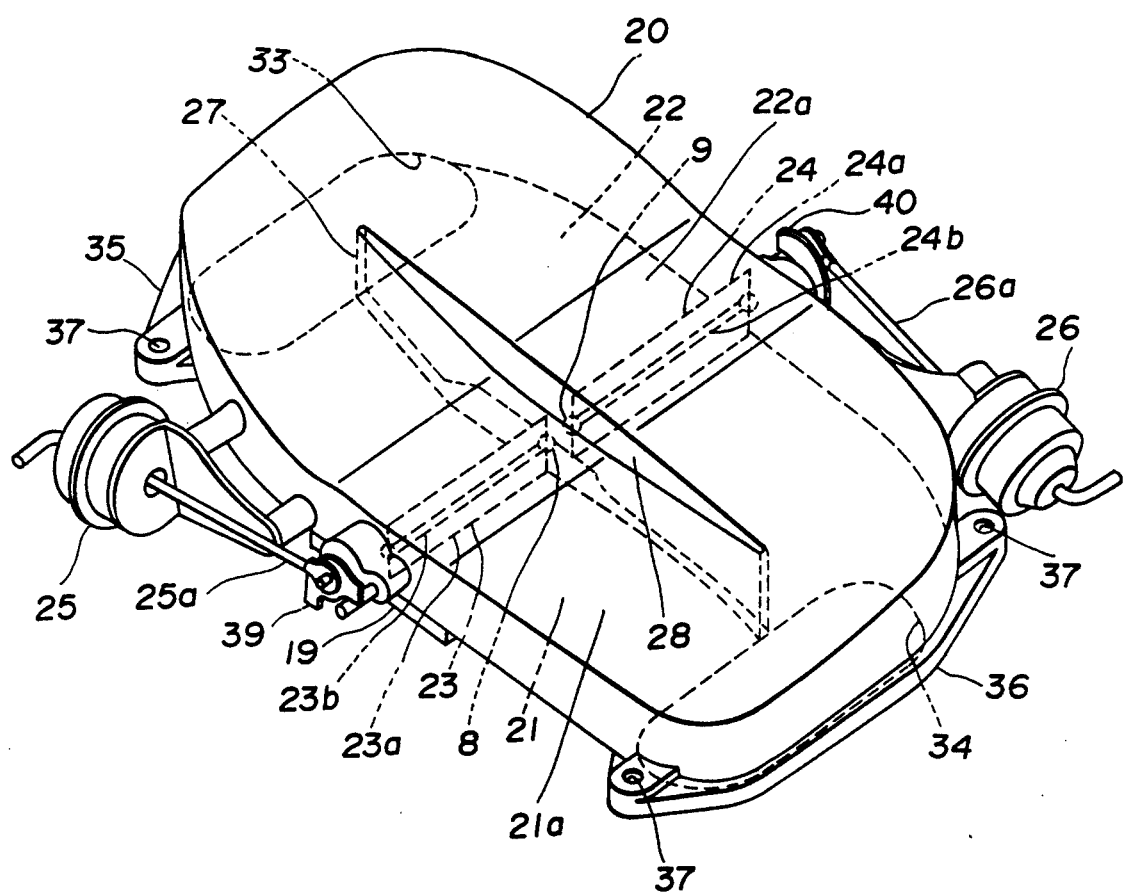
FIG. 7 is a perspective view showing a communicating pipe.

Referring to FIGS. 3 and 7, each connecting flange 35, 36 has front and rear ends formed with bolt holes 37. The communicating pipe 20 is engaged with the upper manifold 12 through bolts (not shown) inserted into the bolt holes 37. A seal member (not shown) is interposed between the communicating pipe 20 and the upper manifold 12.

Referring to FIGS. 3 and 6, the aggregate portions 15, 16 have upper Walls formed with openings 31, 32, whereas the communicating pipe 20 has openings 33, 34 which have the same shape as the openings 31, 32 to correspond thereto. The openings 31, 32 extend parallel with the crankshaft, and have respective marginal portions disposed outside the center lines $O_1$, $O_2$, $O_5$, $O_6$ of the branch pipes 13, 14 arranged at the front and rear ends, ensuring a sufficient opening area of the communicating pipe 20 with respect to the aggregate portions 15, 16.

As best seen in FIG. 7, the communicating pipe 20 is shaped into a flat box, and has a first communicating passage 21 and a second communicating passage 22 which are defined by a partition wall 27 and have different opening sectional areas. Sections of the first and second communicating passages 21, 22 are substantially rectangular, and have different sizes.

A first ceiling wall 21a for defining the first communicating passage 21 is formed to be lower than a second ceiling wall 22a for defining the second communicating passage 22, and a step 28 is formed between the first and second ceiling walls 21a, 22a, so that an engine hood of a motor vehicle is decreasingly inclined from the rear of the vehicle to the front thereof, enabling a reduction in the air resistance of the vehicle.

Arranged within the communicating passages 21, 22 are first and second control valves 23, 24 of the butterfly type which include rectangular valve bodies 23a, 24a and valve stems 23b, 24b for rotatably supporting the valve bodies 23a, 24a, and which are opened and closed through actuators 25, 26 connected to the valve stems 23b, 24b. Connected to the valve stems 23b, 24b at ends which protrude from the communicating pipe 20 are link plates 39, 40 to which rods 25a, 26a of the actuators 25, 26 are connected. The actuators 25, 26 open and close the control valves 23, 24 in accordance with the operating conditions so as to vary gradually the passage area of the communicating pipe 20.

Next, the operation of this embodiment will be described.

Intake air taken through the air cleaner (not shown) is sent from the throttle valves 10 to the aggregate portions 15, 16 via the guide pipes 17, 18, then sucked via the branch pipes 13, 14 within the cylinders which are in the suction stroke. In a predetermined range of low speed rotation, the control valves 23, 24 are both closed to interrupt communication of the aggregate portions 15, 16, thereby carrying out resonance supercharging by using pulsation energy of intake air.

The two guide pipes 17, 18 for conducting intake air out of the throttle valves 10 are connected to the center portions of the aggregate portions 15, 16, thereby enabling setting of the suction passages connecting the throttle valve 10 and the intake valves 8A of the cylinders to the same length. The same length suction passages result in uniformly increased intake efficiency of the cylinders by resonance supercharging in the range of low speed rotation.

Figure 8:
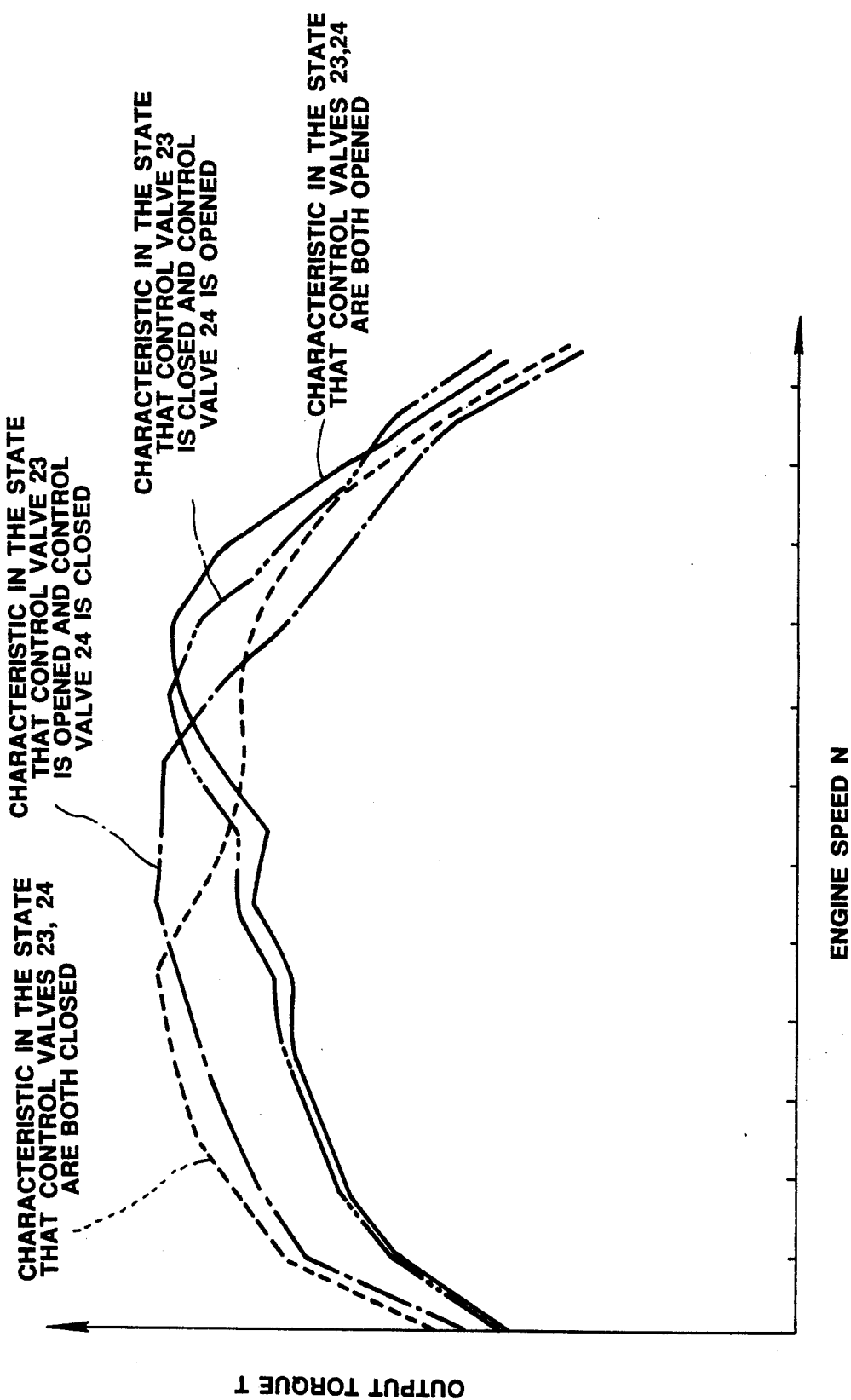
FIG. 8 is a graph showing a characteristic of the V-type engine.

Either of the control valves 23, 24 is selectively opened in a predetermined range of medium speed rotation, whereas the control valves 23, 24 are both opened in a predetermined range of high speed rotation. The control valves are opened to gradually vary the areas of the openings which communicate with the aggregate portions 15, 16, thus switching to inertia supercharging, which uses the columnar inertia of the intake air. Referring to FIG. 8, there is shown a test result for a characteristic of generated torque in accordance with opening and closing of the control valves 23, 24. Based on this characteristic, the control valves 23, 24 are opened and closed to obtain the greatest generated torque in accordance with engine speed.

The second communicating passage 22 having a relatively large sectional area is disposed more rearward than the first communicating passage 21, and thus energy in the direction of the rear of the engine is given to intake air passing through the parallel portions 17b, 18b of the guide pipes 17, 18. The acceleration of the inflow of intake air to the second communicating passage 22 results in increased intake efficiency during high speed rotation.

In the intake manifold 6, the parallel portions 13a, 14a of the branch pipes 13, 14 cross parallel with each other. The intake passages extend horizontally from the branch pipes 13, 14 to the guide pipes 17, 18 via the aggregate portions 15, 16 without turning vertically. The minimal curvature of the intake passage results in reduced intake resistance.

The aggregate portions 15, 16 are disposed inside the bank center lines $A_2$, $A_3$. Therefore, the ignition coils 41 and the ignition plugs arranged thereon can be mounted and detached without removing the intake manifold 6 from the engine main body.

The aggregate portions 15, 16 having relatively great volumes are disposed inside the bank center lines $A_2$, $A_3$, resulting in a design effect of the engine hood line of the vehicle having a center portion higher than a side portion.

Figure 9:
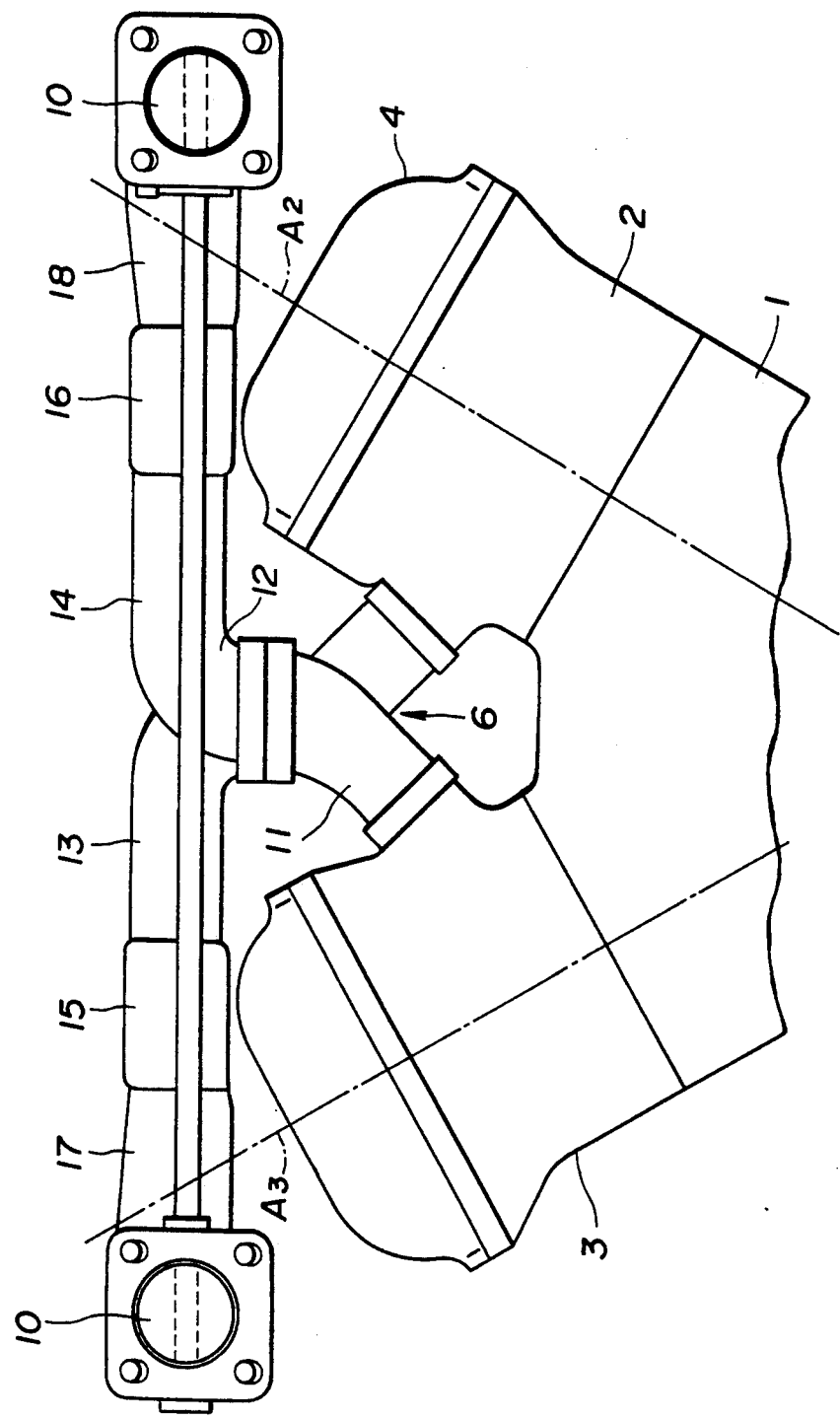
FIG. 9 is a view similar to FIG. 2, showing a second preferred embodiment of the present invention.
Figure 10:
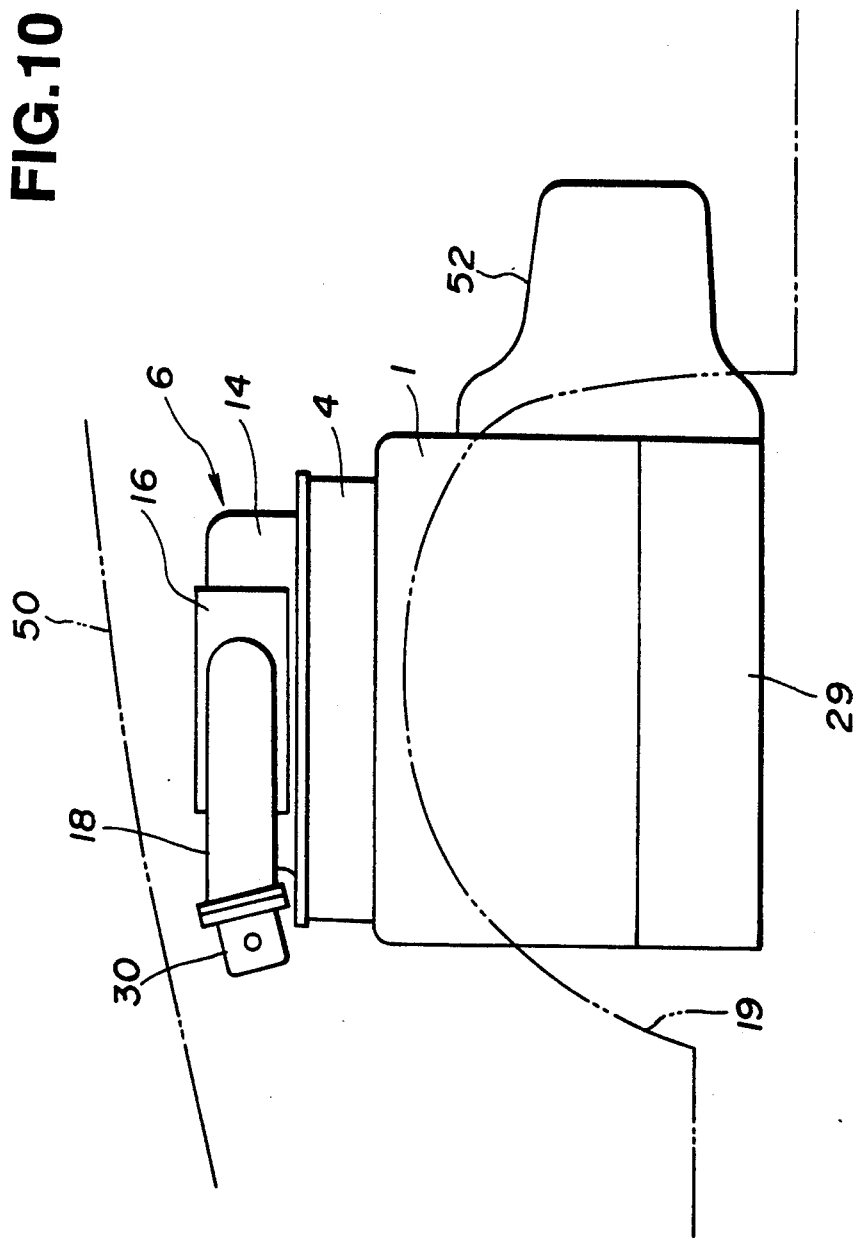
FIG. 10 is a diagrammatic side view showing the V-type engine.
Figure 11:
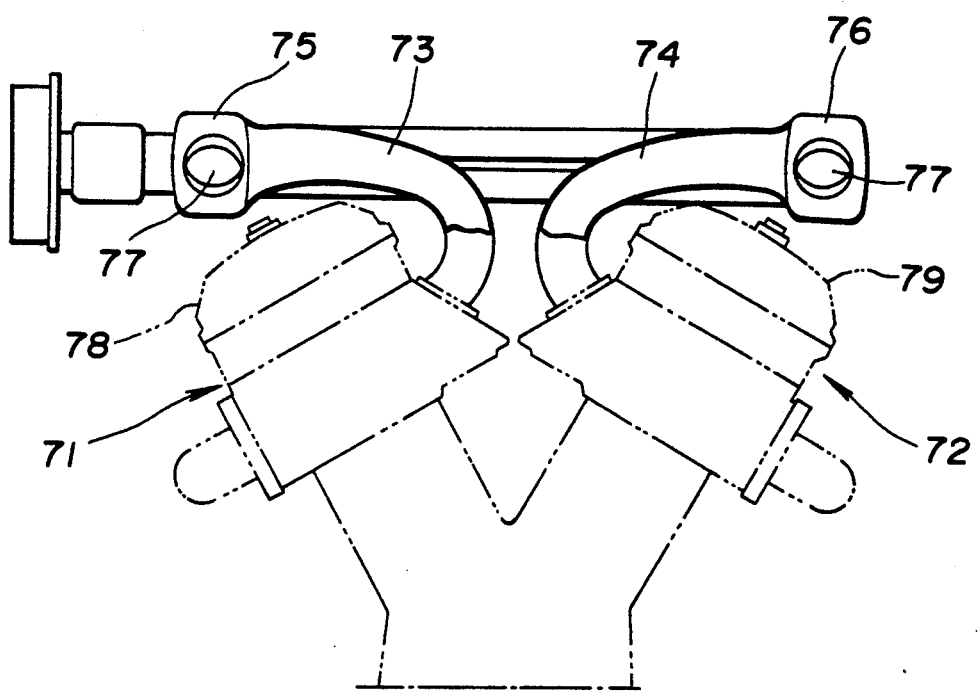
FIG. 11 is a view similar to FIG. 1, showing a known suction system for a V-type engine.

Referring to FIGS. 9 and 10, there is shown a second preferred embodiment of the present invention in which the communicating pipe 20 of the first preferred embodiment is eliminated. According to the second embodiment, the protrusion height of the intake manifold 6 can be lower, resulting in an increased liberty of design relative to the engine hood line 50 of the engine. It is to be noted that in FIG. 10, reference numeral 19 designates a front fender, and 52 designates a transmission connected to the rear of the engine.

Figure 12:
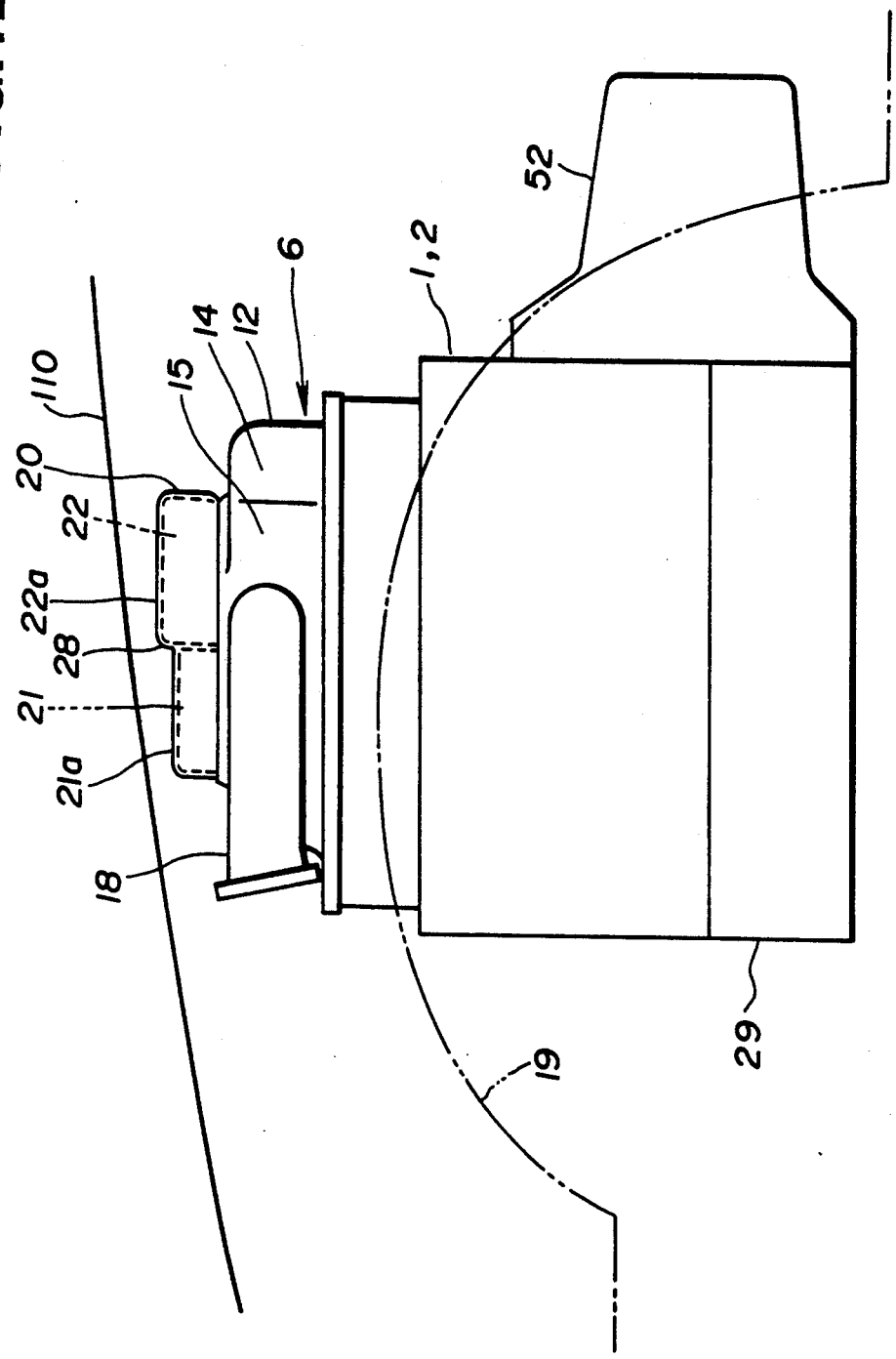
FIG. 12 is a view similar to FIG. 10, showing a third preferred embodiment of the present invention.

Referring to FIG. 12, there is shown a third preferred embodiment of the present invention. Referring to FIG. 3, formed on the periphery of the openings 33, 34 of the communicating pipe 20 are connecting flanges 35, 36 for the aggregate portions 15, 16. The connecting flanges 35, 36 are arranged inside pipe walls 13c, 14c of the branch pipes 13, 14 (i.e. end walls of the aggregate portions 15, 16) that are located at the front and rear ends of the manifold. Referring to FIG. 12, and as described above in connection with FIGS. 1 to 10, an engine hood 110 is decreasingly inclined from the rear of the vehicle to the front thereof. The first ceiling wall 21a for defining the first communicating passage 21 is lower than the second ceiling wall 22a for defining the second communicating passage 22, and a step 28 is formed between the first and second ceiling walls 21a, 22a. Thus, the height of the intake manifold 6 is decreased gradually from the second ceiling wall 22a to the first ceiling wall 21a, ensuring a predetermined space with respect to the engine hood 110. It is to be noted that in FIG. 12, reference numeral 29 designates an oil pan provided on the cylinder block 1 at the lower portion thereof.

According to the third embodiment, the communicating pipe 20 is disposed over the upper manifold 12 and the connecting flanges 35, 36 of the communicating pipe 20 are disposed inside the pipe walls 13c, 14c of the branch pipes 13, 14 that are located at the front and rear ends of the manifold, as shown in FIG. 3. Therefore, the communicating pipe 20 does not overhang the upper manifold 12, thereby ensuring sufficient coupling strength of the communicating pipe 20 to the upper manifold 12 through four bolts. As a result, the communicating pipe 20 does not vibrate much, even with engine vibration and outside impact. Therefore, the seal member interposed between the communicating pipe 20 and the upper manifold 12 is not excessively loaded, and the use of a special seal member or an increase in the number of bolts for engaging the communicating pipe 20 is avoided.

Figure 13:
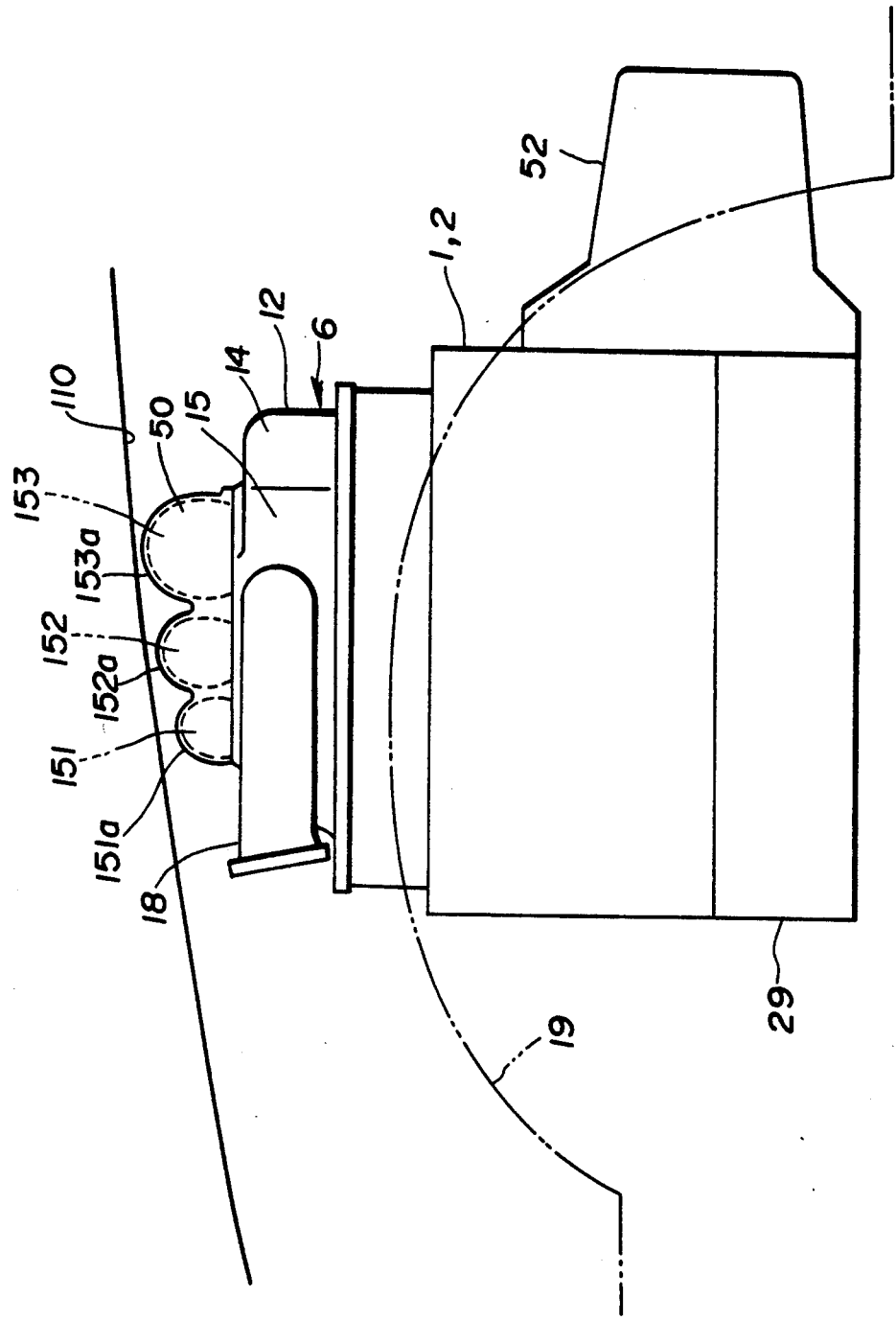
FIG. 13 is a view similar to FIG. 12, showing a fourth preferred embodiment of the present invention.

Referring to FIG. 13, there is shown a fourth preferred embodiment of the present invention. The communicating pipe 50 includes three communicating passages 151, 152, 153. The heights of ceiling walls 151a, 152a, 153a of the three passages 151, 152, 153 are decreased gradually along the engine hood 110. Control valves are arranged within the communicating passages 151, 152, 153 so as to carry out selective opening and closing of the passages in accordance with engine speed, thus achieving a further increase in generated torque of the engine.

According to the fourth embodiment, the ceiling walls 151a, 152a, 153a each have a section formed into an arc, and the heights of the ceiling walls 151a, 152a, 153a are decreased gradually from the rear of the vehicle to the front, thereby minimizing the mounting height of the engine hood 110 which is decreasingly inclined from the rear of the vehicle to the front.

It is to be noted that the shape of the section of the communicating passages 151, 152, 153 is not limited to a rectangle or a circle, but the communicating passages may partly include a trapezoidal or triangular section to avoid interference with the engine hood 110.

Figure 14:
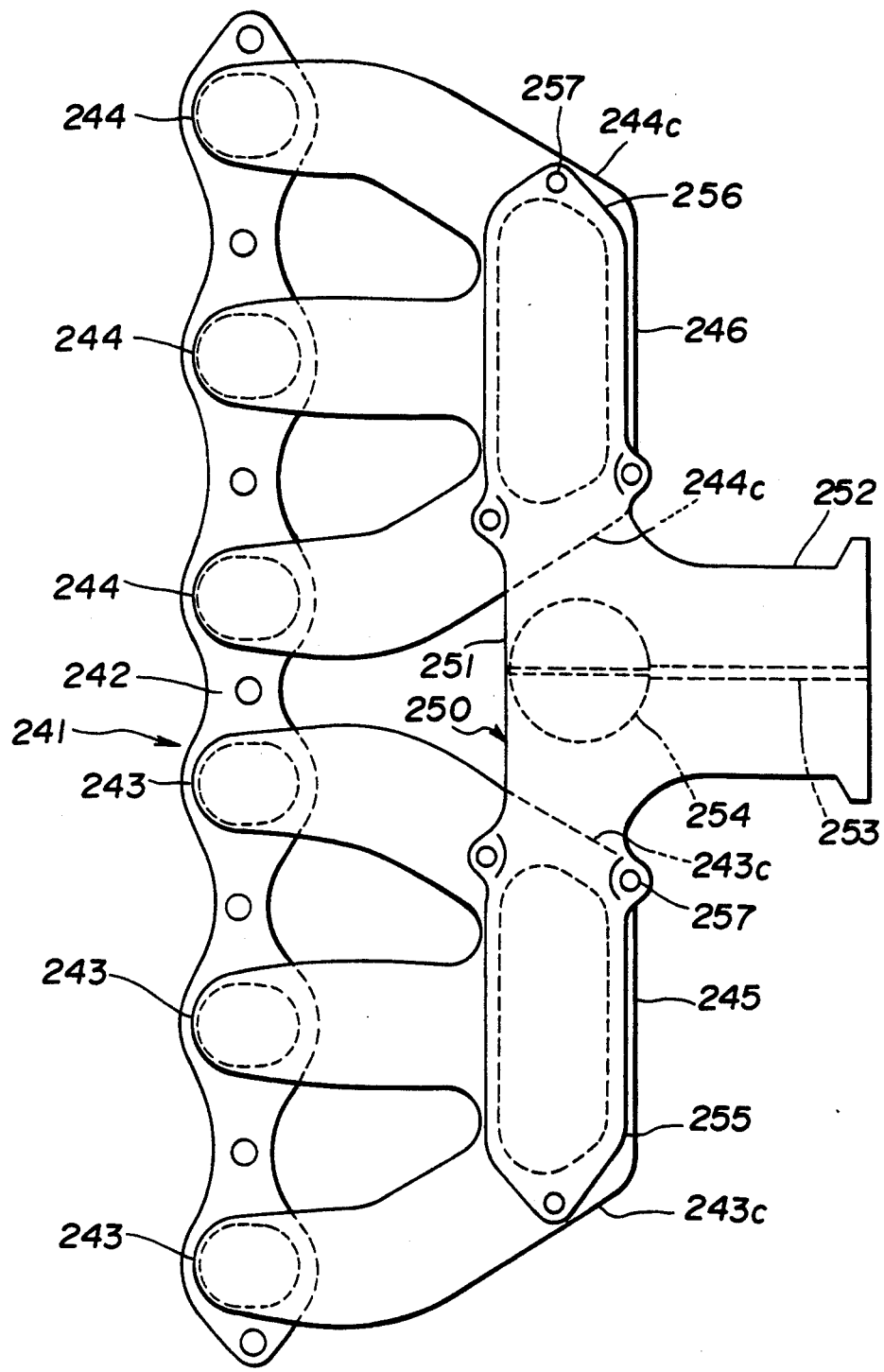
FIG. 14 is a view similar to FIG. 4, showing a fifth preferred embodiment of the present invention.

Referring to FIG. 14, there is shown a fifth preferred embodiment in which the present invention is applied to a straight type six cylinder engine. An intake manifold 241 includes the following integrally formed elements: a connecting flange 242 for the cylinder head (not shown), an aggregate portion 245 which aggregates three branch pipes 243 communicating with cylinders #1, #2, #3 without regard to the ignition order, and an aggregate portion 246 which aggregates three branch pipes 244 communicating with cylinders #4, #5, #6 without regard to the ignition order.

The three branch pipes 243 are arranged to converge at a point, and the three branch pipes 244 are also arranged to converge at a point, thus decreasing the length of the aggregate portions 245, 246 in the direction parallel to the crankshaft.

A communicating pipe 250 which communicates with the aggregate portions 245, 246 is disposed separately therefrom. The communicating pipe 250 includes a communication portion 251 which extends in the direction parallel to the crankshaft, and a guide portion 252 which extends from the center portion of the communication portion 251 in the direction perpendicular to the crankshaft. Intake air taken through the air cleaner (not shown) is sent from the guide portion 252 to the aggregate portions 245, 246 via the communication portion 251, then sucked via the branch pipes 243, 244 within the cylinders which are in the suction stroke.

The communicating pipe 250 has two chambers defined by a partition wall 253 which is formed in the center portion thereof and to which a control valve 254 is mounted. The control valve 254 is opened and closed in accordance with the operating conditions of the engine, thereby increasing the intake efficiency by using the pulsation energy of the intake air.

As shown in FIG. 14, the connecting flanges 255, 256 of the communicating pipe 250 for connecting to the aggregate portions 245, 246 are disposed inside the pipe walls 243c, 244c of the branch pipes 243, 244 located at the front and rear ends.

The communicating pipe 250 has six bolt holes 257 corresponding to the front and rear ends of the connecting flanges 255, 256, and is engaged with the manifold 241 through bolts (not shown) inserted into the bolt holes 257. A seal member (not shown) is interposed between each connecting flange 255, 256 and the manifold 241.

According to this embodiment, since the branch pipes 243, 244 are arranged to converge at a point, respectively, the rigidity of the manifold 241 is increased, and the connecting flanges 255, 256 of the communicating pipe 250 do not overhang the manifold 241, thereby ensuring sufficient coupling strength of the communicating pipe 250 to the manifold 241 through the six bolts.

Figure 15:
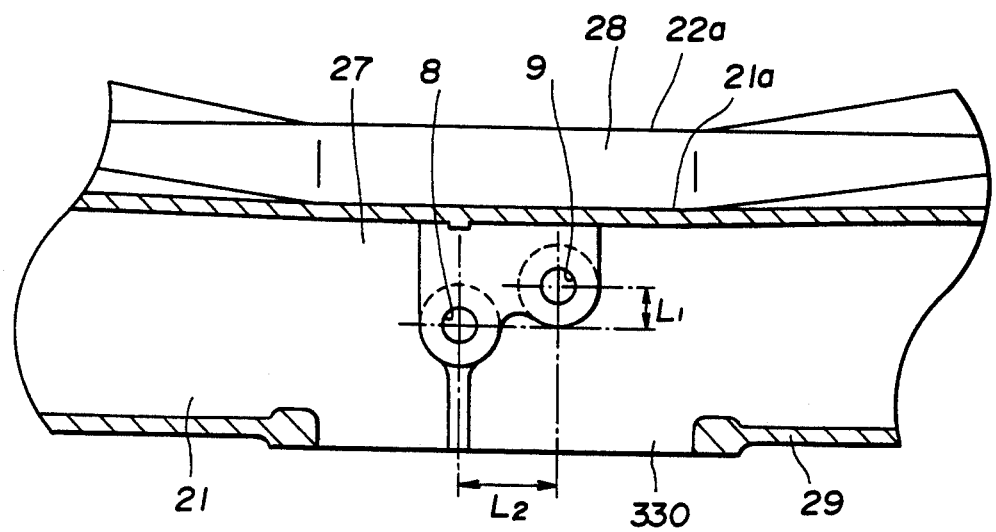
FIG. 15 is a sectional view showing a sixth preferred embodiment of the present invention.

Referring to FIG. 15, there is shown a sixth preferred embodiment of the present invention. Referring also to FIG. 7, the partition wall 27 is formed with first and second bearing holes 8, 9 for rotatably supporting one end of the valve stems 23b, 24b of the control valves 23, 24. The bearing holes 8, 9 are formed through the partition wall 27, respectively.

The first and second bearing holes 8, 9 are arranged to have a predetermined offset amount $L_1$ in the vertical direction, and a predetermined offset amount $L_2$ in the longitudinal direction or the direction perpendicular to the crankshaft. The vertical offset amount $L_1$ is a value determined by a difference in the height of the communicating passages 21, 22. The longitudinal offset amount $L_2$ avoids the valve stems 23b, 24b interfering with each other.

According to the sixth embodiment, the partition wall 27 for defining the communicating passages 21, 22 is formed with the bearing holes 8, 9 for rotatably supporting the valve stems 23b, 24b of the control valves 23, 24. The longitudinal offset amount $L_2$ makes possible a decrease in the thickness of the partition wall 27 which provides a space for forming the bearing holes 8, 9. The sectional area of the communicating passages 21, 22 is thereby increased. As a result, in the operating state when the aggregate portions 15, 16 with the communicating passages 21, 22, a smooth flow of intake air is ensured between the aggregate portions 15, 16, thereby increasing the inertia supercharging effect of the intake air.

Figure 17:
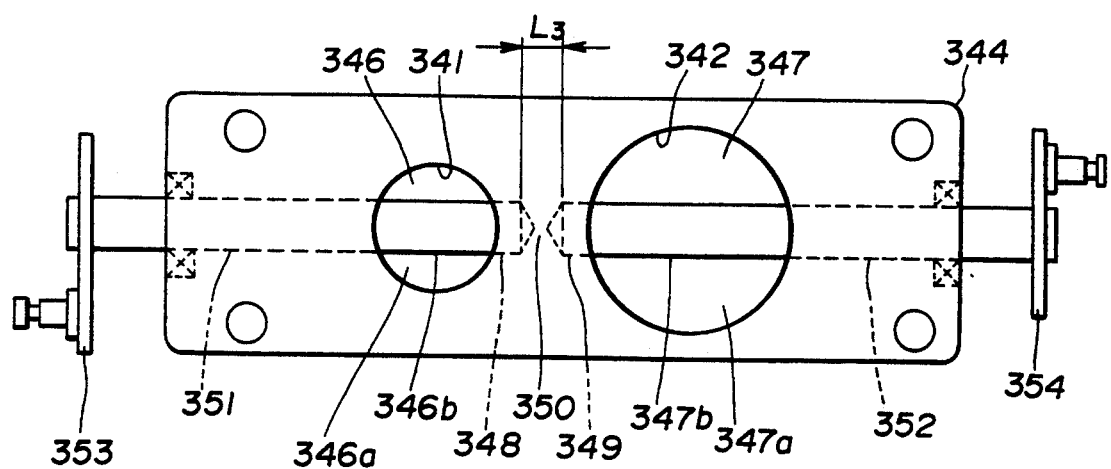
FIG. 17 is a view similar to FIG. 5, showing a valve housing.
Figure 16:
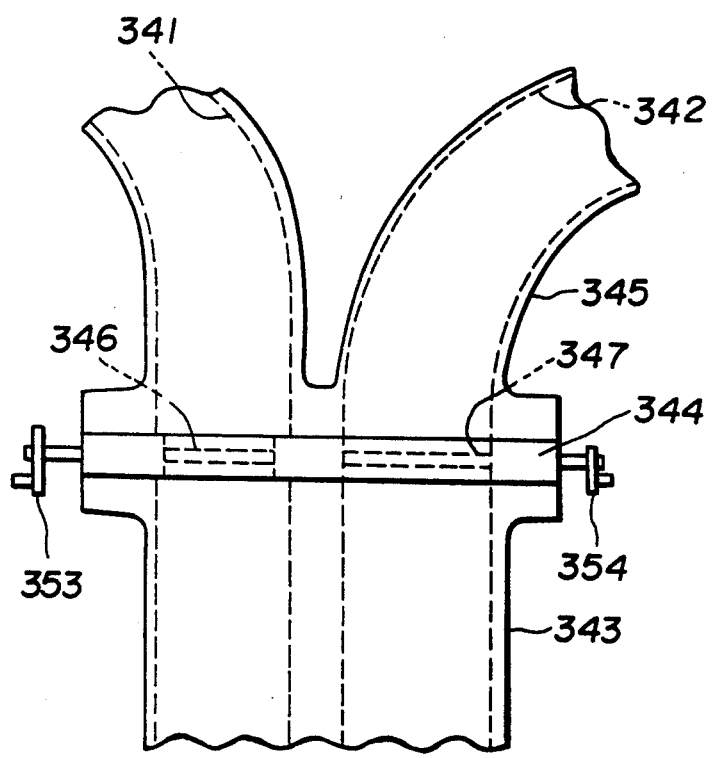
FIG. 16 is a view similar to FIG. 14, showing a seventh preferred embodiment of the present invention.

Referring to FIGS. 16 and 17, there is shown a seventh preferred embodiment of the present invention. As shown in FIG. 16, a valve housing 344 is disposed in a communicating pipe 343 for defining two communicating passages 341, 342 and a communicating pipe 345. Control valves 346, 347 for opening and closing the communicating passages 341, 342 are disposed within the valve housing 344.

As shown in FIG. 17, the control valves 346, 347 include circular valve bodies 346a, 347a, and valve stems 346b, 347b for supporting the valve bodies 346a, 347a. The valve housing 344 includes a partition wall 350 for defining the communicating passages 341, 342. The partition wall is formed with bearing holes 348, 349 for rotatably supporting one ends of the valve stems 346b, 347b. The valve stems 346b, 347b are arranged on the same axis, and the bearing holes 348, 349 are arranged to have a predetermined offset amount $L_3$ in the direction of this axis.

The other ends of the valve stems 346b, 347b are supported by bearing holes 351, 352 formed through the valve housing 343. Link plates 353, 354 coupled with an actuator (not shown) are connected to these other ends of the valve stems 346b, 347b.

According to this embodiment, the partition wall 350 for defining the communicating passages 341, 342 is formed with the bearing holes 348, 349 for rotatably supporting one ends of the valve stems 346b, 347b. Therefore, a sufficient sectional area of the communicating passages 341, 342 is ensured while the outside dimensions of the communicating pipes 343, 345 are restrained, as compared with a structure for forming the communicating passages 341, 342 with separate pipes.

Figure 18:
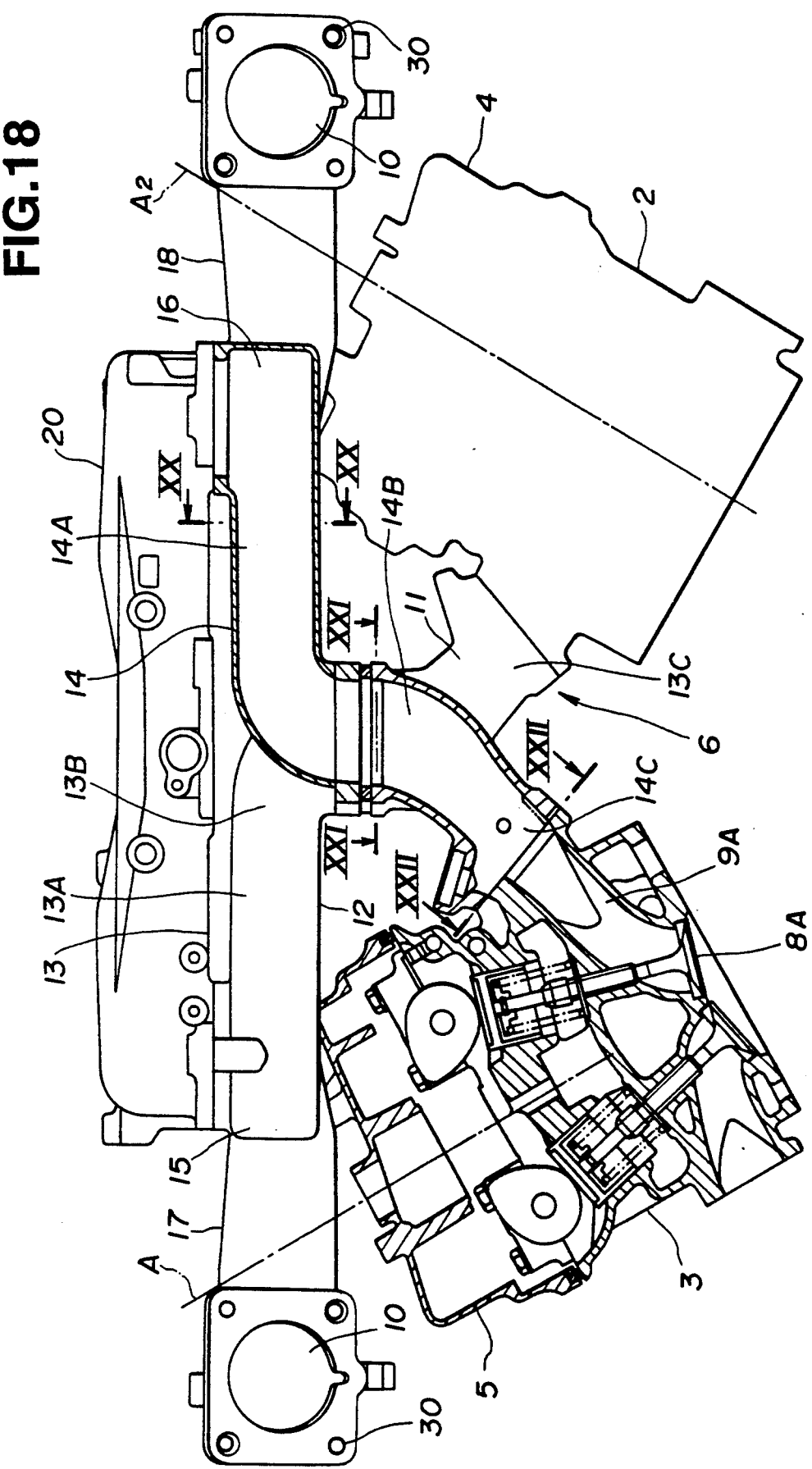
FIG. 18 is a view similar to FIG. 2, showing an eighth preferred embodiment of the present invention.
Figure 19:
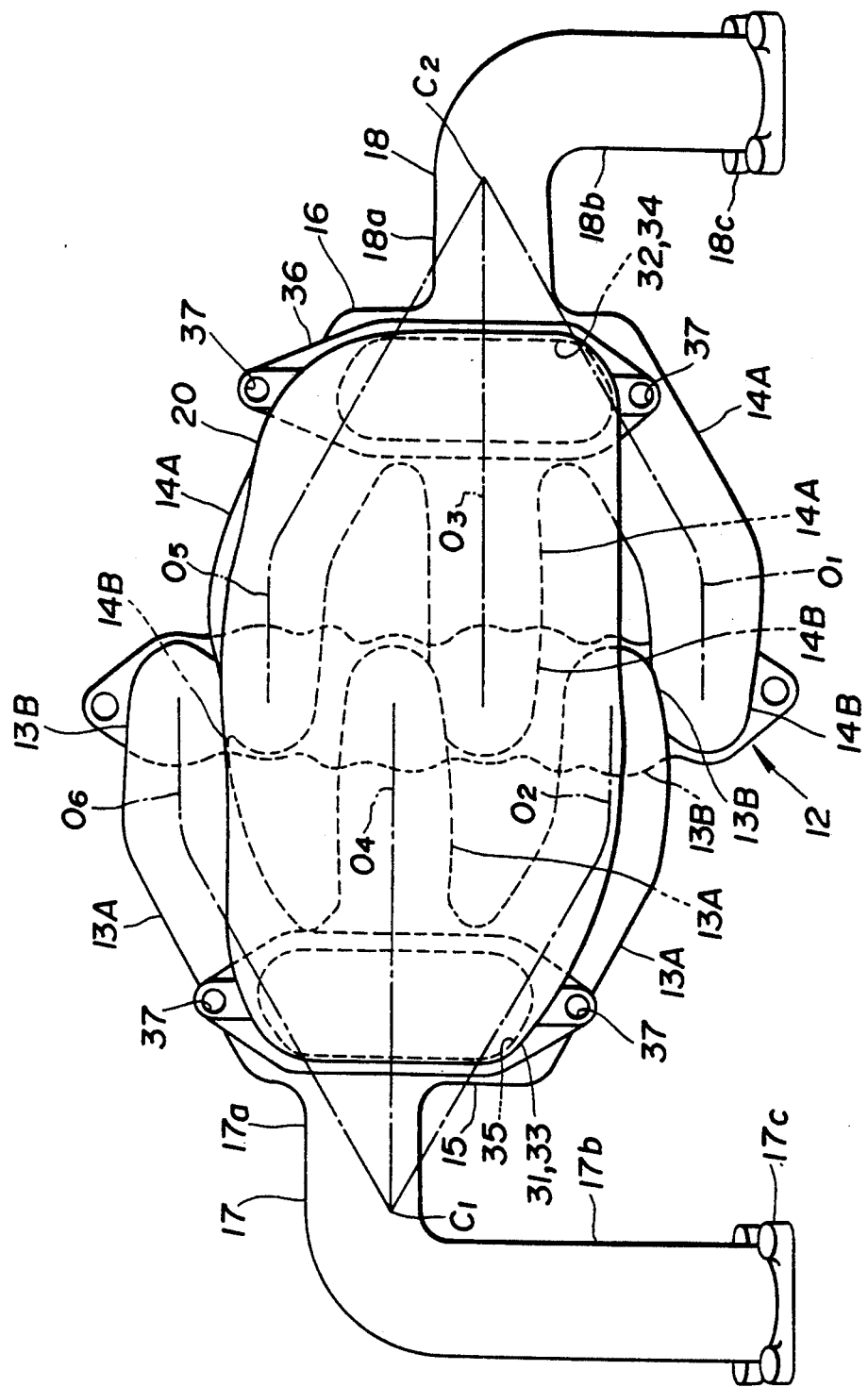
FIG. 19 is a view similar to FIG. 14, showing the suction system.
Figure 20:
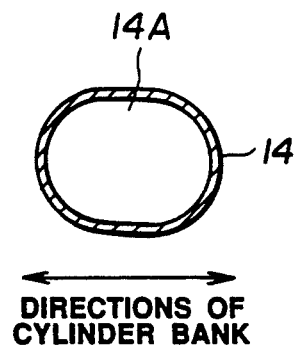
FIG. 20 is a view similar to FIG. 15, taken along the line XX—XX in FIG. 18.

Referring to FIGS. 18 to 22, there is shown an eighth preferred embodiment of the present invention. Referring to FIGS. 18, 19 and 20, the branch pipe 14 has an upstream portion 14A which connects to the aggregate portion 16, and the shape of the section of the upstream portion 14A is an ellipse having a major axis in the direction of the cylinder bank.

Figure 22:
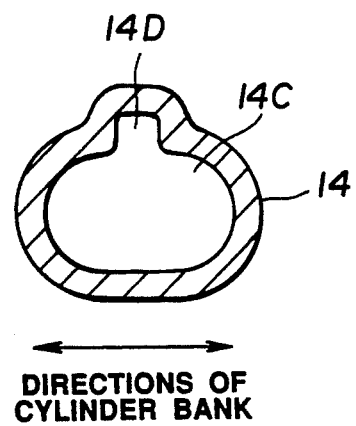
FIG. 22 is a view similar to FIG. 21, taken along the line XXII—XXII in FIG. 18.

Referring to FIGS. 18 and 22, the branch pipe 14 has a downstream portion 14C which connects to the intake ports 9A of the right bank, and the shape of the section of the downstream portion 14C is an ellipse having a major axis in the direction of the cylinder bank. The downstream portion 14C has a recess 14D in the upper portion thereof, which corresponds to a fuel injection valve (not shown).

Figure 21:
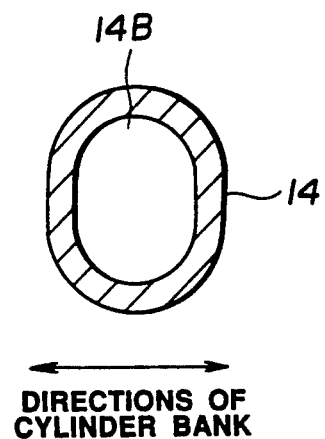
FIG. 21 is a view similar to FIG. 20, taken along the line XXI—XXI in FIG. 18.

Referring to FIGS. 18, 19 and 21, there is shown a cross portion 14B for connecting the upstream and downstream portions 14A, 14C of the branch pipe 14. The cross portion 14B has a section in the shape of an ellipse having a minor axis in the direction of the cylinder bank.

Likewise, the branch pipe 13 connected to the left bank has an upstream portion 13A, a cross portion 13B, and a downstream portion 13C having a section in the shape of an ellipse.

According to this embodiment, the sections of the upstream portions 13A, 14A and the downstream portions 13C, 14C of the branch pipes 13, 14 are formed in the shape of an ellipse having a major axis in the direction of the cylinder bank, respectively. Therefore, the communicating pipe 20 can be arranged over the branch pipes 13, 14 with a sufficient sectional area of the branch pipes 13, 14 ensured and the engine overall height restrained.

Since the sections of the cross portions 13B, 14B of the branch pipes 13, 14 are formed in the shape of an ellipse having a minor axis in the direction of the cylinder bank, respectively, a spacing between the adjacent branch pipes 13, 14 which are arranged to intersect parallel With each other serves to prevent the sectional area of the cross portions 13B, 14B from being restricted, thus ensuring the sufficient sectional area thereof.

What is claimed is:

1. A suction system for a V-type engine of a motor vehicle, the V-type engine being provided with opposed banks having cylinders and throttle valves, comprising:
    two sets of branch pipes arranged to communicate with the cylinders, said two sets of branch pipes being disposed to cross parallel with each other;
    two aggregate portions disposed on each side of the V-type engine, one of said two aggregate portions being connected to one of said two sets of branched pipes which communicates with a fist bank of the cylinders and the other of said two aggregate portions being connected to the other of said two sets of branch pipes which communicates with a second bank of the cylinders, said two aggregate portions being disposed inside center lines of the opposed banks;
    each of said two sets of branch pipes extending respectively from each of said two aggregate portions to an opposite side of the V-type engine wherein said two sets of branch pipes are interdigitated, the one set with the other set;
    two guide pipes connected to said two aggregate portions in centers thereof, respectively, said two guide pipes conducting intake air out of the throttle valves; and
    a communicating pipe disposed over said two sets of branch pipes for communicating with said two aggregate portions.

2. A suction system as claimed in claim 1 wherein said communicating pipe includes a plurality of passages, the system further comprising
    a plurality of control valves disposed within said plurality of passages of said communication pipe, respectively, said plurality of control valves being operated in accordance with operating conditions of the motor vehicle.

3. A suction system as claimed in claim 1, wherein said communicating pipe includes a plurality of passages arranged perpendicular with respect to a longitudinal direction of the motor vehicle, a height of said plurality of passages decreasing gradually from a rear of the motor vehicle to a front thereof.

4. A suction system as claimed in claim 3, wherein said plurality of passages of said communicating pipe are defined by a plurality of partition walls.

5. A suction system as claimed in claim 1, wherein said one of said two sets of branch pipes has respective center lines converging substantially at a first point, and the other of said two sets of branch pies has respective center lines converging substantially at a second point.

6. A suction system as claimed in claim 1, wherein said two sets of branch pipes have upstream portions connected to said two aggregate portions, downstream portions connected to intake ports, and cross portions connecting said upstream portions and said downstream portions, respectively, said upstream and downstream portions each having a section formed in the shape of an ellipse having a major axis in a direction of a cylinder bank, said cross portions each having a section formed in the shape of an ellipse having a minor axis in the direction of said cylinder bank.

7. A suction system for a straight type engine of a motor vehicle, the engine including a bank having cylinders and throttle valves, comprising:
    two sets of branch pipes for communicating with the cylinders;
    two aggregate portions disposed on the engine, one of the two aggregate portions being connected to one of the two sets of branch pipes which communicates with a first portion of the cylinders and the other of the two aggregate portions being connected to the other of the two sets of branch pipes which communicates with a second portion of the cylinders;
    a guide pipe connected to said two aggregate portions for conducting intake air out of the throttle valves; and
    a communicating pipe disposed over the two sets of branch pipes and communicating with the two aggregate portions wherein said communicating pipe has a flange for connection to said aggregate portions and wherein the flange is arranged inside outermost ones of said two sets of branch pipes.

8. A suction system as claimed in claim 4, further comprising a plurality of control valves disposed respectively in said plurality of passages and wherein said plurality of partition walls include bearing holes for rotatably supporting said plurality of control valves, said bearing holes being offset with respect to one another in at least one direction.

* * * * *